US006295248B1

(12) United States Patent
Nakamura (10) Patent No.: US 6,295,248 B1
(45) Date of Patent: Sep. 25, 2001

(54) ELECTRONIC TIDE METER, METHOD FOR CALCULATING A HIGH/LOW TIDE TIME AND COMPUTER ALGORITHM FOR EXECUTING THE SAME

(75) Inventor: Chiaki Nakamura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/328,131

(22) Filed: Jun. 8, 1999

(51) Int. Cl.$^7$ ................................................. G04B 19/26
(52) U.S. Cl. ........................................................... 368/19
(58) Field of Search ................................ 368/1, 15–19

(56) References Cited

U.S. PATENT DOCUMENTS

| | | | | |
|---|---|---|---|---|
| 5,115,417 | * | 5/1992 | Saunders | 368/19 |
| 5,270,986 | * | 12/1993 | Kerr | 368/19 |
| 5,293,355 | * | 3/1994 | Widen et al. | 368/19 |
| 5,299,126 | * | 3/1994 | Spraker | 368/18 |
| 5,347,497 | * | 9/1994 | Allen | 368/19 |
| 5,579,289 | * | 11/1996 | Kerr | 368/19 |

FOREIGN PATENT DOCUMENTS 2654850    11/1989   (FR) .

OTHER PUBLICATIONS

Patent Abstracts of Japan, vol. 007, No. 266 (P–239) Nov. 26, 1983.

* cited by examiner

*Primary Examiner*—Bernard Roskoski
(74) *Attorney, Agent, or Firm*—Adams & Wilks (57) ABSTRACT

The timing of a tide is calculated depending on a user-selected geographic region and calendar date. Tide data is stored in memory for each geographic region available for selection by the user. The timing of a tide is calculated by determining first and second tide level data using a tide level estimating equation. The first tide level data is dependent on the selected calendar date and the stored tide data that corresponds to the selected geographic region. The second tide level data having a time interval that is shorter in duration than a time interval of the first tide level is determined data again using the tide level estimating equation. The timing that a tide corresponding to the selected geographic region and calendar date occurs is then calculated dependent on the second tide level data. Thus, an accurate calculation of the timing of a desired tide is obtained for the user-selected geographic region and calendar date.

16 Claims, 8 Drawing Sheets

ELECTRONIC TIDE METER, METHOD FOR CALCULATING A HIGH/LOW TIDE TIME AND COMPUTER ALGORITHM FOR EXECUTING THE SAME

BACKGROUND OF THE INVENTION

1. Field of the Invention

The present invention relates to an electronic tide meter for calculating a high tide time and low tide time and displaying the result, a method for calculating a high/low tide time and a for executing the method.

2. Description of the Related Art

Tide, defined as the phenomenon of the rising and falling of the sea surface, is a phenomenon to which attention should be paid by those particularly engaged in fishery. Additionally, tide rise and fall are considered important also for those who enjoy shell gathering or marine sports in the coastal area.

Knowing the tide phenomenon, particularly a high tide time and low tide time within a day, is achieved by calculating tide levels based on a harmonic dissolution method. Generally, the results of tide level calculations are available to the public as regional tide information published by public agencies. High tide time and low tide time are to be known by reading the tide information.

However, such reading is inefficient for those who always require information of tide phenomenon. Also, in many cases all of the available tide phenomenon information are not always required. Thus, there has been a desire for a means to know desired tide phenomenon information, particularly high tide time and low tide time.

Under such a situation, an electronic tide meter has been proposed which derives a tide level estimating equation from previously stored tide data and calculates a desirably-dated high tide time and low tide time using the derived tide level estimating equation to calculated and display the result. The tide level estimating equation is a calculating equation prescribed by the harmonic dissolving method using empirically-obtained regional tide data, to determine a tide level at a certain time. For example, according to an electronic tide meter disclosed in JP-B-6-27868 publication, tide levels at a certain time interval corresponding to one day are determined using the above-described tide level estimating equation, and from the determined tide data a extreme values are derived by a approximation method. Then, from the derived extreme values an extreme value with only a proper time interval obtained. The extreme value as a high tide or low tide level is calculated for a high tide time and low tide time.

Meanwhile, according to a tide display apparatus disclosed in JP-A-58-146819 publication, a tide as determined from the above-described tide level estimating equation is graphically displayed to enable reading a high tide time and low tide time from a displayed graph.

However, in order to determine a high tide time and low tide time with accuracy, it is required in the above-mentioned tide level estimating equation to determine the increased number of tide levels with a time interval that is as short as possible. To achieve this, memory with a large capacity had to be used to store many calculated tide data further there is an increased operation time.

In the electronic tide meter disclosed in the above-mentioned JP-B-6-27868 publication, in order to determine a high tide time and low tide time with higher accuracy, it has also been required to determine much of tide data from the tide level estimating equation using a short time interval.

Further, the above-mentioned tide display apparatus disclosed in the JP-A-58-146819 publication time and low tide time, and includes a similar problem to the electronic tide meter disclosed in the JP-B-6-27868 publication.

SUMMARY OF THE INVENTION

The present invention the drawbacks of the prior are. It is an object of the present invention to provide an electronic tide meter for calculating a high tide time and low tide time with high accuracy and at high speed. It is another object of the present invention to provide a high tide/low tide time calculating method and a computer algorithm for executing the invention method.

In order to solve the above-stated problem and achieve the object of the invention an electronic tide meter is provided according to a first embodiment of the present invention, characterized by being provided with: input means for selecting a region and inputting a calendar date; memory means for storing tide data for each region; operating means for determining with a first time interval first tide level data from a tide level estimating equation dependent on the calendar date and the tide data specified by the selected region. A second tide level data is determined with a second time interval shorter than the first time interval from the tide level estimating equation, and calculating from the second tide level data a time that desired tidal phenomenon occurs.

According to this structure, the operating means is provided which performs two staged tide level data calculation such that a first tide level data is determined with a first time interval from a tide level estimating equation dependent on a selected calendar and tide data for each region. A second tide level data is determined with a second time interval shorter in time interval than the first time interval. Accordingly, a range having precise information required can be selected to determine tide level data with a fine time interval for that range. It is therefore possible to eliminate useless operating time and calculate with accuracy a time that desired tide phenomenon occurs.

Also, an electronic tide meter is provided according to a second of the present invention. An electronic tide meter for calculating a high tide time and low tide time by using a tide level estimating equation dependent on an inputted calendar date and tide data of a selected region, characterized by being provided with: operating means for determining with a first time interval first tide level data from the tide level estimating equation, determining, when a sign in displacement between successive ones of the first tide level data changed. Second tide level is determined from the tide level estimating equation with a second time interval shorter in time interval than the first time interval at around a time that the sign in displacement changed. The high tide time and low tide time are then calculated from the second tide level data.

According to this structure, the operating means is provided which performs two staged tide level data calculation such that first tide level data is determined with a first time interval from a tide level estimating equation dependent on a selected a calendar date and tide data for each region. A second tide level data is determined with a second time interval shorter in time interval that the first time interval. Accordingly, a range having precise information required can be selected to determine tide level data with a fine time interval for that range thereby accurately calculating a high tide time and low tide time. It is therefore possible to eliminate useless operating time and calculate with accuracy a high tide time and low tide time.

Also, an electronic tide meter according to a third embodiment of the present invention, in an electronic tide meter for calculating a high tide time and low tide time by using a tide level estimating equation fixed by an inputted calendar and tide data of a selected region, characterized by being provided with: operating means for determining with a first time interval first tide level data from the tide level estimating equation, and determining, when a sign in displacement between successive ones of the first tide level data changed, second tide level data from the tide level estimating equation with a second time interval shorter in time interval than the first time interval at around a time that the sign/in displacement changed; and calculating means for determining an extreme value by interpolating the second tide level data and calculating the high tide time and low tide time from the second tide level.

According to this structure, the operating means is provided which performs two staged tide level data calculation such that first tide level data is determined with a first time interval from a tide level estimating equation dependent on a selected calendar and tide data for each region. A second tide level data is determined with a second time interval shorter in time interval than the first time interval. Accordingly, a range having precise information required can be selected to determine tide level data with a fine time interval for that range. Further, a calculating means is provided to perform an interpolation process on that tide level data. It is therefore possible to eliminate useless operating time and calculate with high accuracy a high tide time and low tide time.

Also, a high tide/low tide time calculating method is provided in accordance with a fourth embodiment of the present invention. A high tide/low tide time calculating method for calculating a high tide time and low tide time by using a tide level estimating equation fixed by an inputted calendar and tide data of a selected region, is characterized by including: a first process for determining with a first time interval first tide level data from a tide level estimating equation; a second process for determining, when a sign in displacement between successive ones of the first tide level data changed, second tide level data from the tide level estimating equation with a second time interval shorter in time interval than the first time interval at around a time that the sign in displacement changed; a third process for determining an extreme value by interpolating the second tide level data; and a fourth process for calculating a high tide time and low tide time from the extreme value.

According to this embodiment, two staged tide level data calculation is performed such that first tide level data is determined with a first time interval from a tide level estimating equation fixed by a calendar and tide data for each region. A second tide level data is determined with a second time interval shorter in time interval than the first time interval. Accordingly, a range having precise information required can be selected to determine tide level data with a fine time interval for that range. Further, an interpolation process is performed on that tide level data. It is therefore possible to eliminate useless operating time and calculate with accuracy a high tide time and low tide time.

Also, a computer algorithm is provided according to a fifth structure of the present invention, to execute a high tide/low tide time calculating method for calculating a high tide time and low tide time by using a tide level estimating equation fixed by an inputted calendar and tide data of a selected region; The computer algorithm including a first procedure for determining with a first time interval first tide level data from the tide level estimating equation; a second procedure for determining, when a sign in displacement between successive ones of the first tide level data changed, second tide level data from the tide level estimating equation with a second time interval shorter in time interval than the first time interval at around a time that the sign in displacement changed; a third procedure for determining an extreme value by interpolating the second tide level data; and a fourth procedure for calculating a high tide time and low tide time from the extreme value.

According to this structure, two staged tide level data calculation is performed such that first tide level data is determined with a first time interval from a tide level estimating equation calendar dependent on a selected date and tide data for each region. A second tide level data is determined with a second time interval shorter in time interval than the first time interval. Accordingly, a range having precise information required can be selected to determine tide level data with a fine time interval for that range. Further, an interpolation process is performed on that tide level data. It is therefore possible to provide a program that can eliminate useless operating time and calculate with accuracy a high tide time and low tide time.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENT

An explanations will be made below on an embodiment of an electronic tide meter according to the present invention. Incidentally, this invention is not limited to this embodiment.

In the electronic tide meter according to the present invention, a tide level estimating equation is to be determined based on a harmonic dissolving method, in determining an objective high tide time and low tide time. Herein, the tide level estimating equation is first explained.

In major coastal regions such as harbor and sea bathing areas, it is usual practice for a public agency or other tide observing station to open to the public tide data native to the region. The tide data as stated herein represents an amplitude or delay angle of each basic wave which is determined by identifying a Fourier series (harmonic resolving method) represented by superposing basic waves from a tide level change graph obtained through measuring with a tide meter in the region, say in the coastal area. Here, the Fourier series to be determined corresponds to a tide level estimating equation, wherein particularly the above-stated amplitude and delay angle is termed as a harmonic constant and each basic wave as a divisional tide.

Tide phenomena occur, as well known, due to the tide generating force as a major factor caused by celestial bodies such as the moon, sun, etc. However, because the tide phenomenon includes the effects of coastal regional topologies, sea water temperature, etc., regionally native tide data, i.e harmonic constant, is essentially required. Also, celestial positions of the moon, sun, etc. are determined by a calendar having year/month/day. Accordingly, in the tide level estimating equation, first determined is a constant in accordance with the calendar.

Next, in the tide level estimating equation, a constant is determined according to an observation point to determine a concrete positional relationship with a celestial body, that is, positional information at a coastal region where a highly low tide time is to be obtained. Finally, the tide level estimating equation is expressed as a time function to determine a regionally native tide level, as follows.

$$h(t) = \sum_{i=j} f_i * H_i \cos\{(V_{0i} + U_i) + \sigma_i * t - g_i\}$$ [Equation 1]

Here, $g_i$ represents a correction delay angle wherein $g_i = \kappa_i + a1 * L - \sigma_i * S$. Also, the affix i is the number representative of a kind of divisional tide. $H_i$ and $\kappa_i$ are above-stated harmonic constants which respectively represent a divisional tide mean amplitude and a divisional tide delay angle (delay amount in phase) at the observation point. Other symbols represent, $f_i$, $V_{oi}$, $U_i$: the astronomical factor at a universal time 0 o'clock, $\sigma_i$: the angular speed for each divisional tide, a1: the number of divisional tide waves, L: the observation point longitude (west longitude +, east longitude −), and S: the standard difference in time at the observation point.

Incidentally, the divisional tide means a wave caused due to a tide generating force from each celestial body. In particular the divisional tide is further divided on a certain period basis into periodic tides. For example, a half day periodic wave (main lunar half periodic tide) due to the tide generating force of the moon is called a $M_2$ divisional tide, and a half day periodic wave (main solar half periodic tide) due to the tide generating force of the sun is called a $S_2$ divisional tide.

Here, it is required to fix the number of divisional tides to be used in the tide level estimating, equation. The greater the number of divisional tides, the higher the accuracy of a high/low tide time to be operated. However, there is a necessity to take into account an operation time and the number of regional tide data to be used. For example, $S_a$, $S_{sa}$, $Q_1$, $O_2$, $P_1$, $K_1$, $\mu_2$, $N_2$, $\nu_2$, $M_2$, $S_2$, $K_2$, $M_4$, $MS_4$ are selected, and numbers are affixed from 1. The divisional tide herein listed is a periodic tide based on the tide generating force from the sun or moon. Alike $M_2$ and $S_2$ as above, for example $Q_1$, $O_1$, $P_1$ and $K_1$ respectively define individual waves as a main lunar elliptical-rate tide, main lunar diurnal tide, main solar diurnal tide, sun-moon combined diurnal tide.

In Equation 1, by first determining a region (observation point), an observation point longitude L and an observation point standard difference of time S are determined and further harmonic constants ($H_i$, $\kappa_i$) are determined for the respective divisional tides. Next, -by determining a calendar, astronomical factors $f_i$, $V_{oi}$, $U_i$ are fixed for the respective divisional tides. The number of waves al and angular velocity $\sigma_i$ of the divisional tide are numerals readily fixed in each divisional tide.

This angular velocity $\sigma_i$ is calculated by $a1*T_{av} + a2*s_{av} + a3*h_{av} + a4*p_{av}$ which is a combination of respective changes per hour, i.e.

$T_{av} = 15°$ $s_{av} = 0.54901652$ $h_{av} = 0.04106864$ $p_{av} = 0.00464181$ and each integer parameter (a1, a2, a3, a4), based on celestial body movement, in T: solar mean time angle, s: lunar mean longitude, h: solar mean longitude, p: lunar close point mean longitude. Here, a1 is used as the number of divisional tide waves and one of integer parameters to determine the number of divisional tide waves. For example, in the case of $M_2$ divisional tide, (a1, a2, a3, a4)=(2, −2, 2, 0) and its angular velocity $\sigma_i$ is expressed as 2*15−2*0.54901652+2*0.04106864= 28.9841042.

In this manner, because the angular velocity $\sigma_i$ is a value previously determined together with the delay angle $\kappa_i$ for each divisional tide, the positional information L and S at the region is determined and at the same time the correction delay angle $g_i$ is also fixed in value. Accordingly, it becomes satisfactory to at least prepare, as native tide data to the region, angular velocity $\sigma_i$ for each divisional tide, correction delay angle $g_i$ and harmonic constant $H_i$.

The astronomical factor $V_{oi}$ (Greenwich reference) is calculated by $a2*s + a3*h + a4*p$ that is a combination of s, h, p and integer parameters (a2, a3, a4) as was explained in calculating the angular velocity $\sigma_i$. Here, expressions are made as:

s=211.728+129.38471*Y−2000)+13.176396*(D+L)

h=279.974−0.23871*(Y−2000)+0.985647*(D+L)

p=83.298−40.66229*(Y−2000)+0.111404*(D+L)

where, Y, D and L are numerals derived from the calendar, which are represented as Y: dominical year, D: days elapsed from January 1 of year Y, L: the number of bissextile days between the beginning of the year Y and the beginning of year 2000. In particular, L=int [(Y+3)/4]−500. Here, int [ ] represents an integer portion and L is dealt with as a negative value for the year before 2000.

Also, the astronomical factor $U_i$ is expressed as $u_i + c$ wherein c is an integer parameter and $u_i$ is expressed as a series of a trigonometric function. N is expressed, using a calendar Y, D and L, as:

N=125.071−19.32812*(Y−2000)−0.052954*(D+L).

Accordingly, the sum of the astronomical factors $V_{oi}$ and $U_i$ is expressed as:

$V_{oi} + U_i = a2*s + a3*h + a4*p + c + u_i$ which is a value to be determined by calendar Y, D for each divisional tide. For example, in the case of $M_2$ divisional tide (i=10), $V_{O10} + U_{20} = -2s + 2h + u_{10}$ The astronomical factors $f_i$ and $u_i$, for example for $M_2$ divisional tide (i=10), are respectively expressed as:

$f_{10} = 1.0004 − 0.0373*\cos N + 0.0002*\cos 2N$ $u_{10} = −2.14*\sin N$.

By determining a region (observation point) and calendar, h(t) is finally constituted as a sum of equations representative of tide levels each for divisional tide which is a tide level estimating equation for calculating a tide level at time t.

Figure 1:
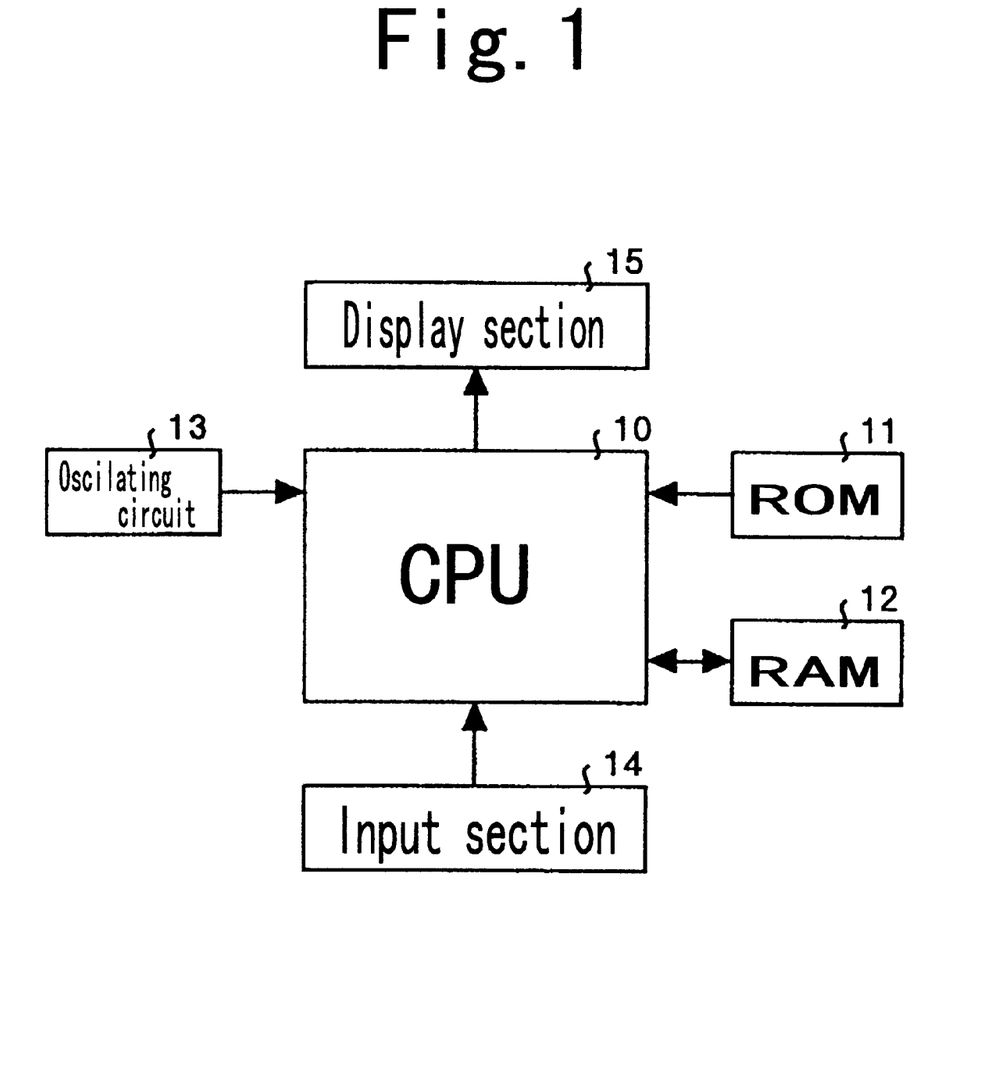
FIG. 1 is a block diagram of an electronic tide meter according to an embodiment; of the present invention

The electronic tide meter according to the present invention functions utilizing the tide level estimating equation as explained above. FIG. 1 is a block diagram of the electronic tide meter according to the present invention. In FIG. 1, the electronic tide meter is configured by an input section 14 enabling input of a calendar and region selection, etc. from a utilizer, a central processing unit (CPU) 10 for calculating a high/low tide day time in accordance with the requirement through the input section 14 from the utilizer, an oscillating circuit 13 for generating a clock to drive the CPU 10, a ROM 11 stored with an operation program for the CPU 10, etc. , a RAM 12 for memorizing a result of calculation by the CPU 10 and a set state given by the utilizer, etc. and a display section 15 for displaying a result of the calculation by the CPU 10, etc.

The ROM 11 is further is stored with tide data, for example, an angular speed $\sigma_i$ for each divisional tide, a correction delay angle $g_i$ and a harmonic constant $H_i$, as stated above. The number of divisional tides used in the tide data is determined by a memory capacity of the ROM 11.

Figure 2:
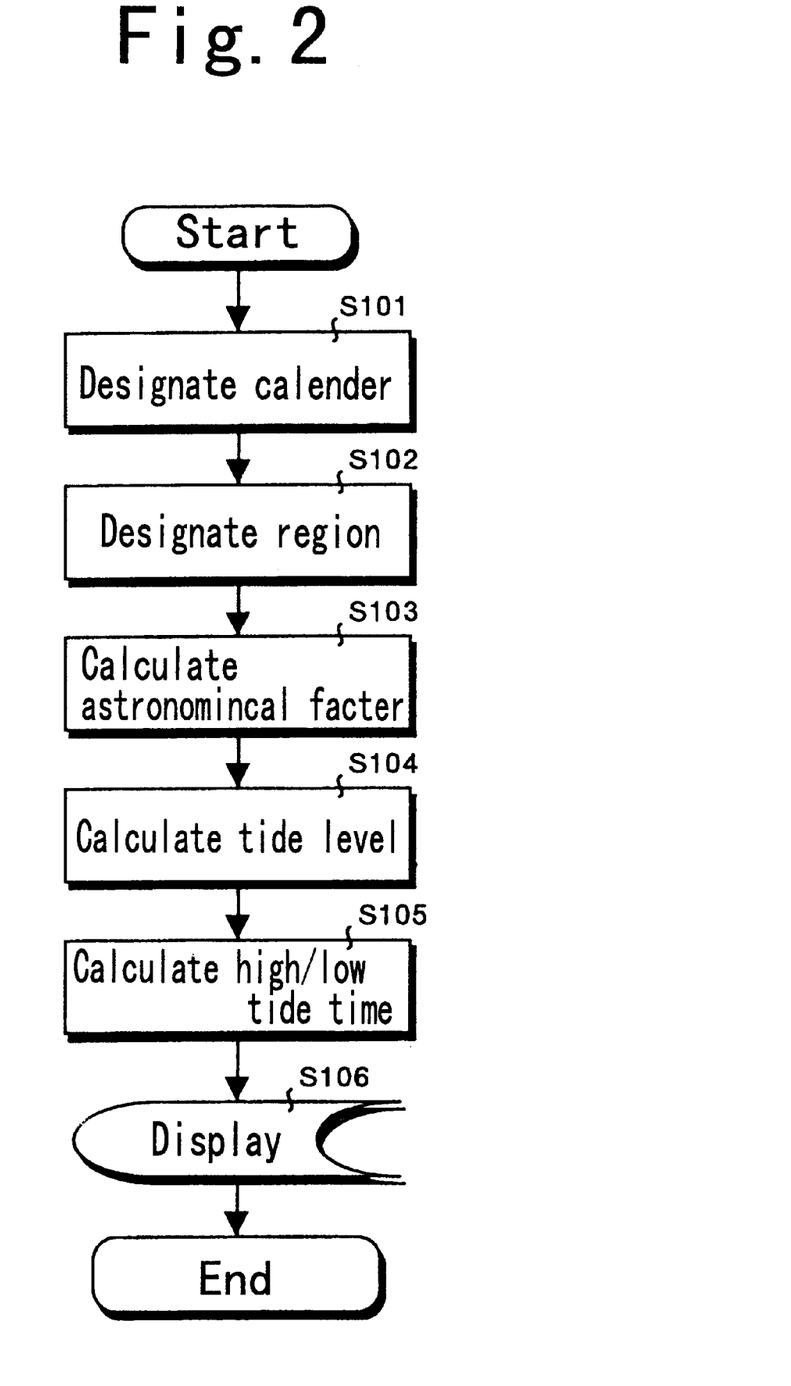
FIG. 2 is a flowchart showing the operation of the electronic tide meter according to the embodiment.

Next, the operation of the electronic tide meter according to the present invention is explained with reference to a flowchart shown in FIG. 2. First, the utilizer inputs through the input section 14 a year/month/day (calendar) that a high/low tide time is to be known (step S101).

Then, the utilizer selects, through the input section 14, a region of which high/low tide time is to be known from a region list stored in the ROM 11 (step S102). This determines angular velocities $\sigma_i$, correction delay angles $g_i$ and harmonic constants $H_i$ native to the selected region for respective ones of the divisional idea.

In the process of the step S101, if the inputted year/month/day is for example year of y/m-th month/d-th day, y is converted into a dominical year Y (y=no conversion s required it dominical year), to calculate the number of elapsed days from January 1 to a d-th day of a m-th month as well as the number of bissextile days between the beginning of year Y and the beginning of year 2000. This determines astronomical factors $f_{i,\ V_{oi}}$ and $U_i$ for respective divisional tides (step S103).

By the above steps S101–S103, first decided is a tide level estimating equation h(t) for determining a tide level at a time t. The electronic tide meter of the present invention is characterized by making a tide level operation using this tide level estimating equation h(t) by two stages (step S104).

Figure 3:
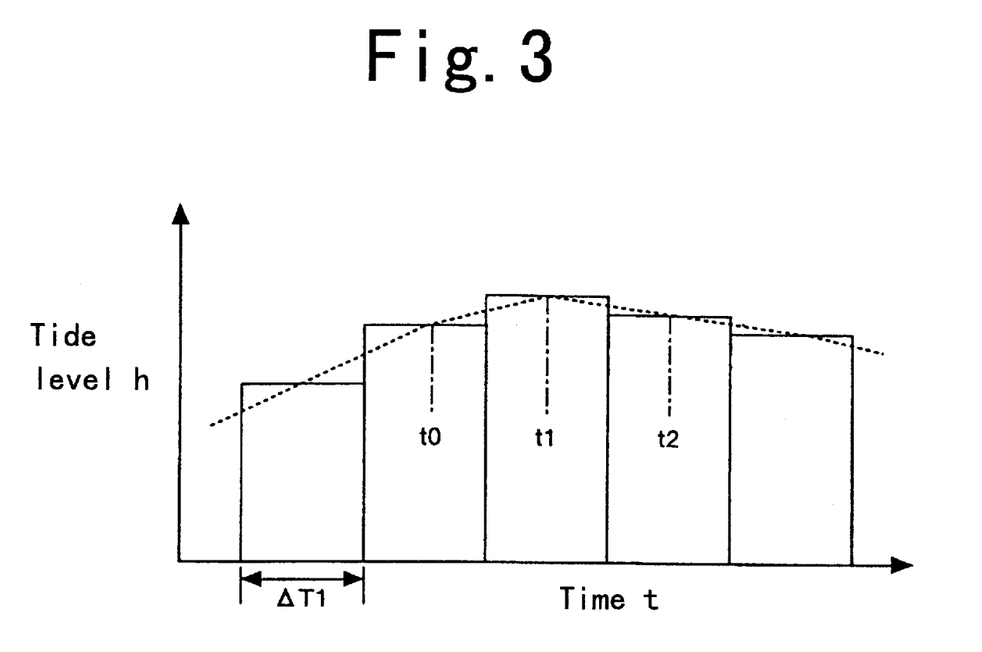
FIG. 3 is a diagram showing the operation of the electronic tide meter according to the present invention.
Figure 4:
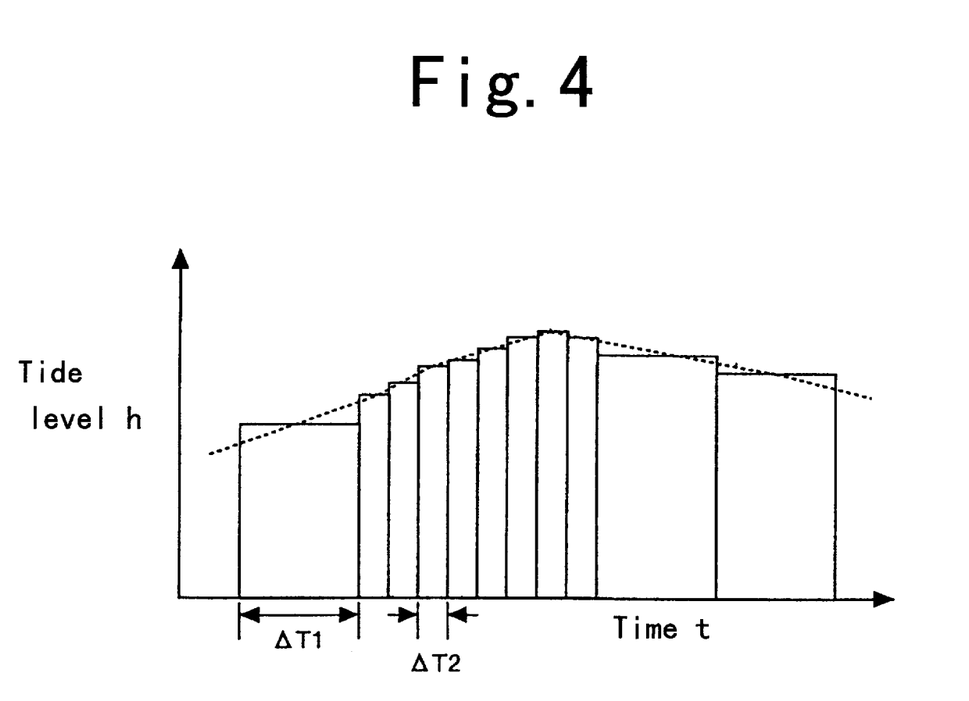
FIG. 4 is a diagram showing the operation of the electronic tide meter a according to the present invention.

FIG. 3 demonstrates a result of tide level operation in the first stage. FIG. 4 shows a result of tide level operation in the second stage. Incidentally, in FIG. 3 only one part of it is shown. First, for the first staged tide level operation, tide levels at t=0–24 o'clock are calculated with an time interval for example of $\Delta T1=60$ minutes. Thereupon, simultaneously calculated is a tide difference df2=h(t2)−h(t1) between a tide level h(t2) presently (time t2) operated and a tide level h(t1) lastly (at a time t1) operated. Further, examination is made for difference in sign between the present-time (time t2) tide level difference df2 and the last-time (time t1) tide difference df1=h(t1)−h(t0) from its further past tide level (t0). Incidentally, the results of the above operation are sequentially stored into the RAM 12.

Here, if there is a difference in sign between the tide differences df2 and df1, for a second staged tide level operation, tide levels are again calculated with an interval for example of $\Delta T_2=20$ minutes, as shown in FIG. 4. In this case, the tide level (t0) of $2*\Delta T_1$, before the present time (time t2) is taken as a start time of the second staged tide level operation. It has been confirmed by the first staged tide level operation that there existed, between from the time t0 to the time t2, a time at which the sign of tide difference changes, that is, a time point of inflection in the tide level. Accordingly, in the second staged tide level operation, the tide level of between the time t0 and the time t2 is determined with a further shorter interval thereby making it possible to derive a true point of inflection.

After deriving a true point of inflection in the second staged tide level operation, a second staged tide level operation is made again from the time t2, that is, tide level is calculated with a time interval of $\Delta T_1$.

Figure 5:
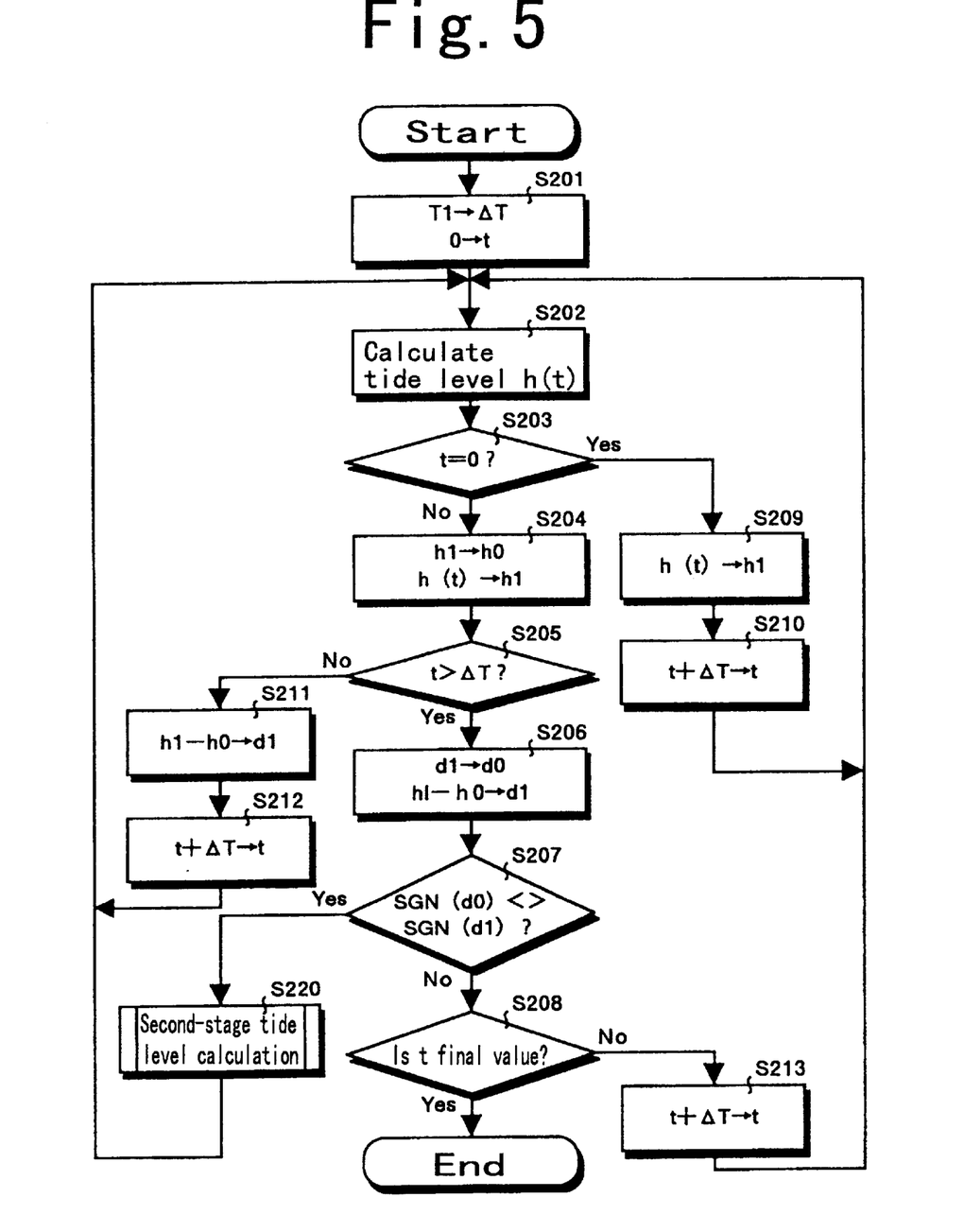
FIG. 5 is a flowchart for explaining tide level operating process according to the present invention.
Figure 6:
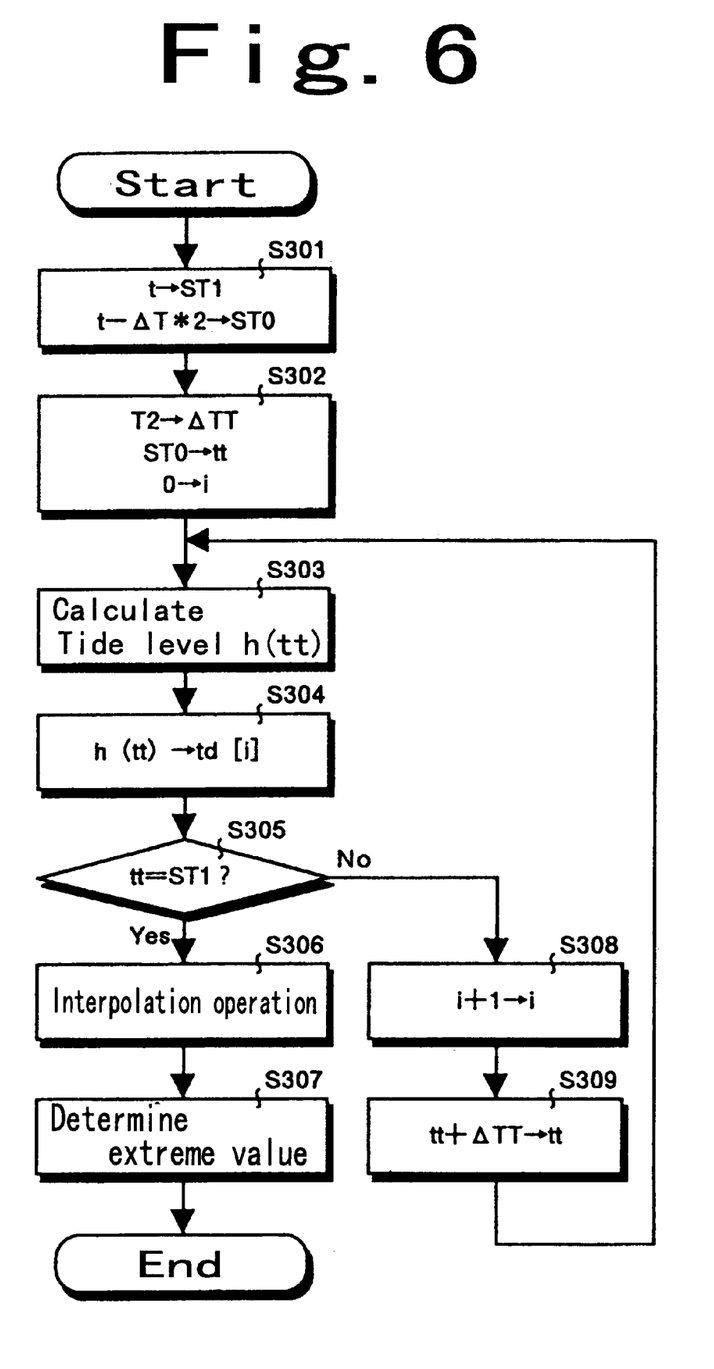
FIG. 6 is a flowchart for explaining a tide level operating process according to the present invention.

The above step S104 process is explained with reference to flowcharts shown in FIG. 5 and FIG. 6. FIG. 5 is a flowchart to conduct the first staged tide level operation, while FIG. 6 is a flowchart to perform second staged tide level operation.

First, in step S201, T1 (e.g. 60 minutes) is substituted for the time interval $\Delta T$ that is for determining a tide level in the tide level estimating equation and an initial value 0 is substituted for the time t. t=0 in this case represents 0 o'clock. Subsequently, a tide level h(t) at that time t is calculated by using the above-described Equation 1 (step S202).

Next, determination is made on whether the time t is an initial value (in this case, t=0?) (step S203). If t=0 in the step S203, the tide level h(t) calculated in the step S202 is substituted for a tide level variable h1 (step S209). After the step S209, the time t is put forward by a time interval $\Delta T$ minutes (step S210), and the process is returned to the step S202. This is corresponds to the initial process for determining a difference in tide level, hereinafter referred to.

If not t=0 in the step S203, the tide level variable h1 is already stored with a value and the value stored in this h1 is substituted for the tide level variable h0. Subsequently, the tide level h(t) calculated in the step 3202 is substituted for the tide level variable h1 (step S204). Next, determination is made as to whether the time t is put forward by the time interval $\Delta T$ or greater from the initial value (step S205).

If not t>$\Delta T$ in the step S205, a tide level difference is not determined and a result of operation h1−h0 is substituted for the differential variable d1 (stop S211). After step S211, the time t is put forward by a time interval $\Delta T$ minutes (step S212), and the process is returned to the step S202. This corresponds to the initial process for determining a sign of a difference in tide level, hereinafter referred to.

If t >$\Delta T$ in the step S205, the difference variable d1 is already stored with a value and the value stored in this d1 is substituted for a differential variable d0 and subsequently a result of the operation h1−h0 is substituted for the differential variable d1 (step S206). After step S206, determination is made on whether the differential variables d0 and d1 are coincident in sign (step S207). Incidentally, in the step S207 of FIG. 5, SGN ( ) is a function for obtaining a sign.

In the step S207, if the signs of the differential variables d0 and d1 are not coincident, it is represented that an extreme value of tide level exists between this time t and a time t−$\Delta T*2$. The process enters to the second staged tide level operation (step S220). After processing the step S220, the process is again returned to the step S202.

If in the step S207 the signs of the differential variables d0 and d1 are coincident, determination is made on whether the time t represents a final value (step S208). Here, the final value represents a final value in a time range for conducting whole-day tide level operation. For example, where conducting tide level operation of t=0–24 o'clock, the final value is a value representative of 24 o'clock.

In step S208, if the time t does not represent a final value, the time t is put forward by $\Delta T$ minutes (step S213) and the process is returned to the step S202. If the time t represents a final value in the step S208, the tide level operating process, i.e. the process of stop S104 of FIG. 2, is ended.

Next, explanation is made on the second staged tide level operating process in the step S220 of FIG. 5. First, the time t at a time point that the process enters to the step S220 of FIG. 5 is substituted for an end time STi, and a time t−ΔT*2 before that time t is substituted for a start time ST0 (step S301). Further, for a time interval ΔTT is substituted a time interval T2 (e.g. 20 minutes) that is smaller than the time interval ΔT in the first staged tide level operating process, and the start time ST0 is substituted for a time tt. Also, 0 is substituted for a variable representative i of an arrangement number of a tide level arrangement variable td (step S302).

After processing the step S302, a tide level h(tt) at that time tt is calculated by using the above-described Equation 1 (step S303), and the tide level h(tt) calculated in the step S303 is further substituted for the tide level arrangement variable td[i] (step S304).

Next, determination is made on whether the time tt is equal to the end time ST1 (step S305). In the step S305 if the time tt is not equal to the end time ST1, a variable i is added by 1 (step S308). The time tt is put forward by a time interval ΔTT minutes (step S309), and the process is returned to the step S303. By repeating the series of process over from the step S303 to step S309, the tide level h(tt) calculated with the time interval ΔTT becomes stored in the tide level arrangement variable td[i].

In the step S305, if the time tt is equal to the end time ST1, interpolation operation is made using the value stored in the tide level arrangement variable td[i] and a tide level distribution equation is determined which is in a range of from the start time ST0 to the end time ST1 (step S306). From the tide level distribution equation determined in the step S306, an extreme value is determined using, for example, a Lagrangian three-point inverse interpolation method (step S307). Further, a time representative of the extreme value is calculated, thus ending the second staged tide level operating process.

Consequently, according to the operation shown by the flowcharts of FIG. 5 and FIG. 6 as explained above, a tide level h(t) is determined as a fist staged tide level operation with a first time interval ΔT, a put-forward time t is backed by ΔT*2 at a time point that the displacement sign in the tide level is changed to thereby again determine a tide level h(t−ΔT*2−t) as a second staged tide level operation with a second time interval ΔTT having a value smaller than the time interval ΔT, and an extreme value is calculated from that tide level. After ending the second staged tide level operation, the fist stated tide level operation is again entered whereby these first and second staged tide level operations are repeated over those of the whole-day time. Some extreme values (ideally four extreme values) are finally obtained thus ending the process of step S104 in the flowchart of FIG. 2.

After ending the process of the step S104, a high/low tide time is calculated from the obtained some extreme values (step S105). The calculated high/low tide time is displayed on the display section 15 (step S106).

Figure 7:
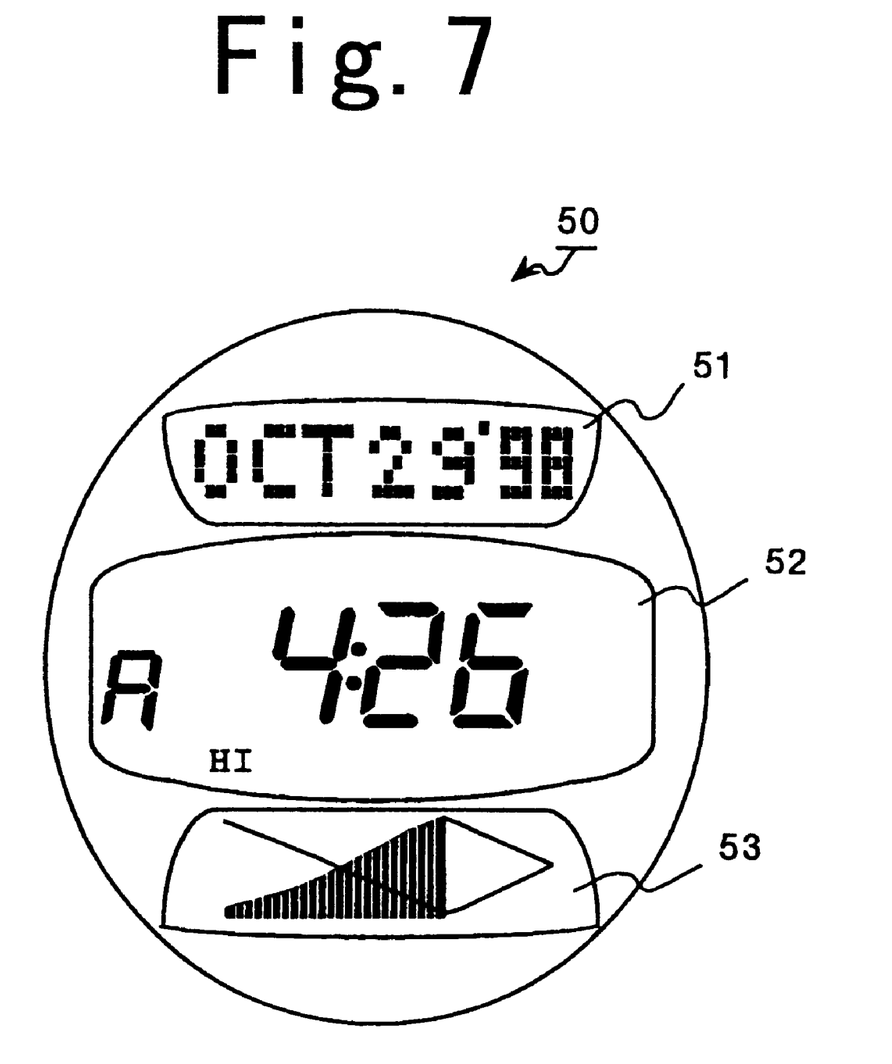
FIG. 7 is a view showing an example of displaying a high tide time of t electronic tide meter according to the present invention.
Figure 8:
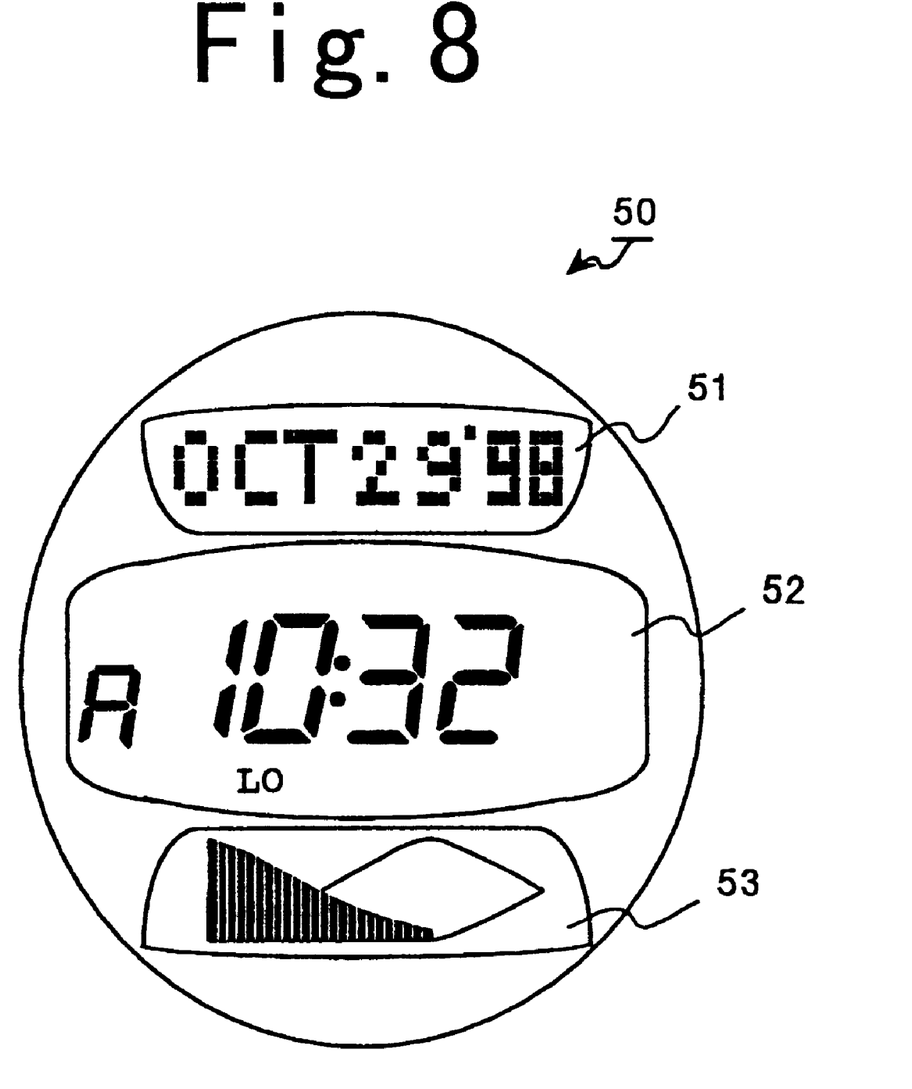
FIG. 8 is a view showing an example of displaying a high tide time of the electronic tide meter according to the present invention.

FIG. 7 and FIG. 8 illustrate examples respectively displaying a high tide time and a low tide time in the display 50 corresponding to the display section 15. In display area 51 of FIG. 7 and FIG. 8, year/month/day is displayed. This is a display region for input confirmation in inputting year/month/day by an utilizer, and also a display region for selecting a region. Also, in the display region 52 a calculated high tide time or low tide time is displayed. Further, a mark is simultaneously displayed which is to discriminate whether on high tide time and low tide time. Furthermore, in the display region 53 a graph is displayed which is to discriminate whether on high tide time or low tide time.

According to the electronic tide meter as explained above, in order to determine a high/low tide time, a whole-day tide level is first determined by a rough time interval so that a tide level is again determined by a fine time interval for a limited range having a time around which the sign in displacement of the determined tide level changes, thereby calculating an extreme value. It is therefore possible to shorten operation time and at the same time obtain an accurate high/low tide time.

In the embodiment as explained above, the second staged tide level operation re-determined all the tide levels of from a start time of the second staged tide level operation process to an end time, In this time range, the tide level operation may be ended at a time point that the tide level displacement sign changes similarly to the first staged tide level operation process, to determine an extreme value using the tide levels before the tide level displacement sign changes.

Also, in the embodiment as explained above, the second staged tide level operation was performed in the course of the first staged tide level operation process. However, after the first staged tide level operation is all ended, the second staged tide level operation process may be made based on the result.

In the embodiment as explained above, although two staged, time interval different tide level operation processes were provided, a plurality of tide level operation processes with a furthershorter time interval may be prepared. In such a case, the time interval can be similarly switched to conduct an operation process to finally determine an extreme value based on a result of tide level operation shortest in time interval.

Furthermore, the electronic tide meter according to the present invention is applicable not only for determining a high/low tide time but also for a case of determining a time that other tide phenomena occur.

Furthermore, the high/low tide time calculating method as was explained in the embodiment can be memorized as a computer program on an recording medium such as a magnetic disc, optical disc, etc. so that a high/low tide time can be calculated by reading out the program in a computer.

According to the first structure of the present invention, an operating means is provided which performs two staged tide level data calculation such that first tide level data is determined with a first time interval from a tide level estimating equation fixed by a calendar and tide data for each region and further second tide level data is determined with a second time interval shorter in time interval than the first time interval. Accordingly, a range having precise information required can be selected to determine tide level data with a fine time interval for that range. It is therefore possible to eliminate useless operating time and calculate with accuracy a time that desired tide phenomenon occurs.

According to the second embodiments of the present invention, an operating means is provided which performs two staged tide level data calculation such that first tide level data is determined with a first time interval from a tide level estimating equation fixed by a calendar and tide data for each region and further second tide level data is determined with a second time interval shorter in time interval than the first time interval. Accordingly, a range having precise information required can be selected to determine tide level data with a fine time interval for that range thereby calculating a high tide time and low tide time. It is therefore possible to eliminate useless operating time and calculate with accuracy a high tide time and low tide time.

According to the third embodiments, an operating means is provided which performs two staged tide level data calculation such that first tide level data is determined with a first time interval from a tide level estimating equation fixed by a calendar and tide data for each region and further second tide level data is determined with a second time interval shorter in time interval than the first time interval. Accordingly, a range having precise information required can be selected to determine tide level data with a fine time interval for that range. Further, a calculating means is provided to perform an interpolation process on that tide level data. It is therefore possible to eliminate useless operating time and calculate with accuracy a high tide time and low tide time.

According to the fourth embodiments of the present invention, two staged tide level data calculation is performed such that first tide level data is determined with a first time interval from a tide level estimating equation fixed by a calendar and tide data for each region and further second tide level data is determined with a second time interval shorter in time interval than the first time interval. Accordingly, a range having precise information required can be selected to determine tide level data with a fine time interval for that range. Further, an interpolation process is performed on that tide level data. It is therefore possible to eliminate useless operating time and calculate with accuracy a high tide time and low tide time.

According to the fifth embodiments of the present invention, two staged tide level data calculation is performed such that first tide level data is determined with a first time interval from a tide level estimating equation fixed by a calendar and tide data for each region and further second tide level data is determined with a second time interval shorter in time interval than the first time interval Accordingly, a range having precise information required can be selected to determine tide level data with a fine time interval for that range Further, an interpolation process is performed on that tide level data. It is therefore possible to provide a program that can eliminate useless operating time and calculate with accuracy a high tide time and low tide time.

What is claimed is:

1. An electronic tide meter, comprising: an input unit for selecting a geographic region and inputting a calendar date; storing means for storing tide data for each of a plurality of geographic regions; and operating means for determining first tide level data having a first time interval from a tide level estimating equation dependent on the selected calendar date and the tide data corresponding to the selected geographic region, for determining second tide level data having a second time interval shorter in duration than the first time interval from the tide level estimating equation, and for calculating from the second tide level data a time that a desired tide corresponding to the selected geographic region and calendar date occurs.

2. An electronic tide meter according to claim 1; wherein the tide level estimating equation is determined based on a harmonic dissolving method.

3. An electronic tide meter according to claim 1; wherein the tide level estimating equation is determined based on tide data representing one of an amplitude and a delay angle of each basic wave in the selected geographic region and comprises a Fourier series represented by the superposition of basic waves obtained from tide level changes in the selected geographic region.

4. An electronic tide meter according to claim 3; wherein the tide level estimating equation comprises the Fourier series, and wherein the amplitude and delay angle is a harmonic constant based on the selected geographic region and each basic wave is a divisional tide.

5. An electronic tide meter according to claim 4; wherein the harmonic constant is determined in accordance with the selected calendar date.

6. An electronic tide meter according to claim 4; wherein the ROM storing means stores an angular speed for each divisional tide, a correction delay angle and a harmonic constant for each of the plurality of geographic regions.

7. An electronic tide meter for calculating when a high tide or a low tide occurs, comprising: operating means for determining first tide level data having a first time interval using a tide level estimating equation for calculating a tide level based on a selected calendar date and a selected geographic area, for determining when a sign of a displacement value between successive first tide level data determined using the tide level estimating equation changes, for determining second tide level data having a second time interval shorter in duration than the first time interval from the tide level estimating equation at around a time that the sign of said displacement value changed, and calculating a time of a tide dependent on the second tide level data.

8. An electronic tide meter according to claim 7; further comprising an input unit for selecting a geographic region and inputting a selected calendar date; and storing means for storing tide data for each of a plurality of geographic regions.

9. An electronic tide meter according to claim 8; wherein the tide level estimating equation is determined based on a harmonic dissolving method.

10. An electronic tide meter according to claim 9; wherein the tide level estimating equation is determined based on tide data representing one of an amplitude and a delay angle of each basic wave in the selected geographic region and comprises a Fourier series represented by the superposition of basic waves obtained from a tide level changes in the selected geographic region.

11. An electronic tide meter according to claim 10; wherein the tide level estimating equation comprises the Fourier series, and wherein the amplitude and delay angle is a harmonic constant based on the selected geographic region and each basic wave is a divisional tide.

12. An electronic tide meter according to claim 10; wherein the harmonic constant is determined in accordance with a selected calendar date.

13. An electronic tide meter according to claim 10; wherein the storing means stores an angular speed for each divisional tide, a correction delay angle and a harmonic constant for each of the plurality of geographic regions.

14. An electronic tide meter for calculating when a high tide or a low tide occurs, comprising: operating means for determining first tide level data having a first time interval using a tide level estimating equation for calculating a tide level based on a selected calendar date and a selected geographic area, for determining when a sign of a displacement value between successive first tide level data determined using the tide level estimating equation changes, for determining second tide level data having a second time interval shorter in duration than the first time interval from the tide level estimating equation at around a time that the sign of said displacement value changed; and calculating means for calculating an extreme value by interpolating the second tide level and calculating a time of a tide dependent on the second tide level.

15. A high tide/low tide time calculating method, comprising the steps of: determining first tide level data having a first time interval using a tide level estimating equation for calculating a tide level based on a selected calendar date and a selected geographic area; determining when a sign of a determined displacement value between successive first tide level data determined using the tide level estimating equation changes; determining second tide level data from the tide level estimating equation having a second time interval shorter in duration than the first time interval at around a time that the sign in the displacement value changed; determining an extreme value by interpolating the second tide level data; and calculating a time of a tide dependent on the extreme value.

16. A computer algorithm for calculating the timing of a tide, comprising the steps of: determining first tide level data having a first time interval using a tide level estimating equation for calculating a tide level based on a selected calendar date and a selected geographic area; determining when a sign of a displacement value between successive first tide level data changes; determining second tide level data having a second time interval shorter in duration than the first time interval from the tide level estimating equation at around a time that the sign of the displacement value changed; determining an extreme value by interpolating the second tide level data; and calculating, a time of a tide dependent on the extreme value.

* * * * *